United States Patent Office.

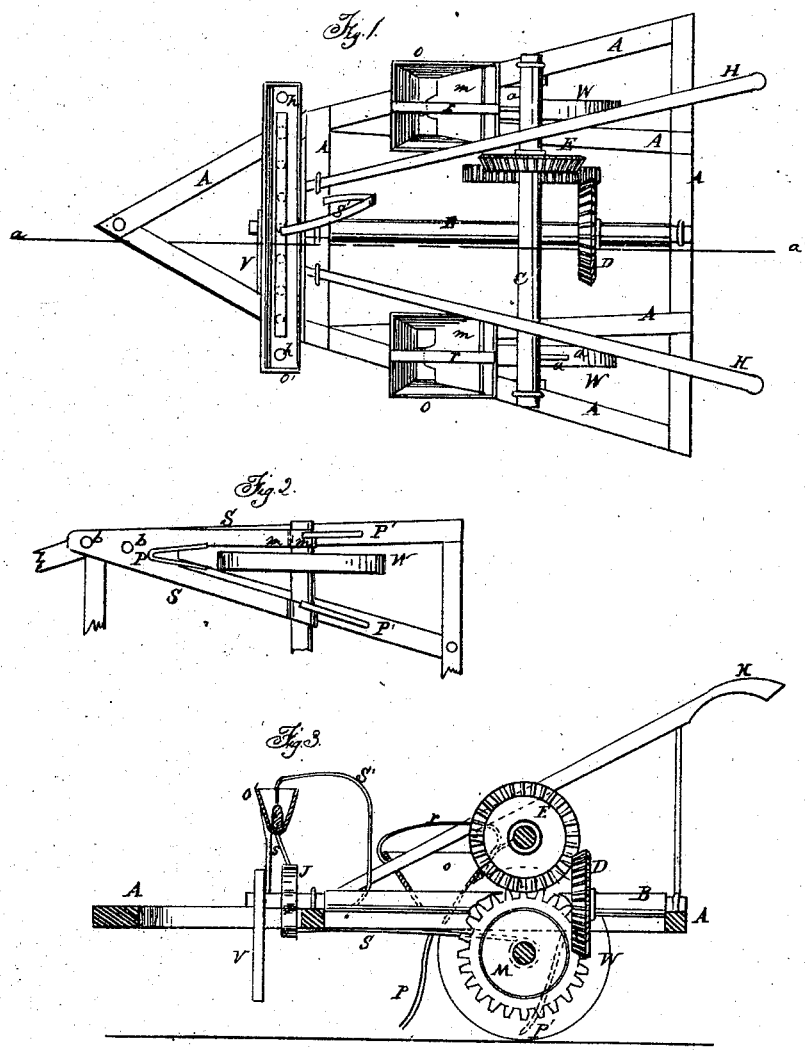

LEWIS BISHOP, OF TALLADEGA, ALABAMA.

Letters Patent No. 75,845, dated March 24, 1868.

IMPROVEMENT IN CULTIVATORS AND SEEDERS.

*The Schedule referred to in these Letters Patent and making part of the same.*

TO ALL WHOM IT MAY CONCERN:

Be it known that I, LEWIS BISHOP, of Talladega, in the county of Talladega, and State of Alabama, have invented a new and improved Cultivator and Seeder; and I do hereby declare that the following is a full, clear, and exact description thereof, which will enable others skilled in the art to make and use the same, reference being had to the accompanying drawings, forming part of this specification, in which—

Figure 1 is a top view of my cultivator and seeder.

Figure 2 is a detail view, showing the attachment of the wheels.

Figure 3 is a section through the line $a\ a'$, fig. 1.

Similar letters of reference indicate corresponding parts.

This invention consists in the adaptation of springs to the wheels of cultivators, whereby inequalities of the soil may be passed over with facility, and other devices, tending to perform in a more perfect manner the operations of seeding, planting, and chopping out cotton-stalks, as will be hereinafter more fully explained.

In the drawings, figs. 1 and 2, A represents the general frame of the machine, supported by the wheels W, which run in bearings $m\ m$, formed on the spring S, as shown in detail at fig. 2. This spring is formed of two parts joined together, and bolted to the frame A by the bolts $b$, though it can be made of one part only, or otherwise, and answer the purpose. These springs do not rest wholly against the frame to which they are bolted, but a portion of their length curves downward, thus leaving space to vibrate, and accommodate the wheels to the unequalities of the soil, as will be more fully explained.

Upon the shaft connecting the two wheels rigidly, is placed a wheel, M, having cog-teeth upon its periphery. This wheel turns with the driving-wheels W, and engages the teeth of the two wheels E and D'. These two latter wheels work upon shafts B and C, at right angles with each other, each shaft having its bearings in the general frame A, as shown in figs. 1 and 2. The shaft B is provided, at its forward end, with a cotton-chopper, V, and a star-wheel, J, to be explained, the said star-wheel and chopper being rotated as the machine is drawn forward.

The shaft C is formed with two pins or projections, $a\ a$, near its outer end. By means of the wheels E and D, engaging with the main wheel M, secured to the axle of the driving-wheels W, the two shafts B and C are revolved by the forward or backward motion of the cultivator, as all the wheels are keyed firmly on their respective shafts or axles.

On the frame A, just forward of the wheels W, are placed the hoppers O O, having their throats partially or nearly closed by the oblique movable plates $m$, which plates are supported by the bent springs $r\ r$, attached to the upper and forward parts of the hoppers. The office of the plates $m\ m$ is to close or open the throat of the hopper, so that the seed may be delivered therefrom, and they are thus opened by the action of the pins $a\ a$ on the shaft C', when the latter is rotated, the said pins striking the springs $r$ near their junctions with the plates $m$, and slightly lifting it in passing, after which the throats of the hoppers are closed by the plates being carried back to their stationary position by the tension of the springs $r$. In these hoppers are placed cotton-seed, and the same are dropped into the furrow made by the furrowing-ploughs P, and the furrows are closed by the covering-ploughs P', at each side of the wheels W.

In the drawings, the hoppers and their plates are designed for cotton, but corn-planting devices of the ordinary construction may be substituted therefor, if desired.

On the front end of the frame is another hopper, O', for sowing wheat, oats, rye, or other small grain, and within the hopper is a strip of wood, serrated or notched on its under edge. This strip of wood or agitator, lettered $i$, is connected by a spring, $s'$, with the frame A, which bears it, with a slight tension, down on the bottom of the hopper O'; and over holes $h$, along the said bottom. A small portion of spring $s'$ passing downward from the agitator $i$, through a hole in the hopper, is impinged upon by the aforesaid star-wheel J, in its revolutions, and the agitator thus lifted from over the holes $h$, whereby a small quantity of the grain is dropped upon the ground, to be afterwards covered. By the revolution of the same shaft, B, the curved hoe or cotton-chopper, V, is made to chop out the cotton-stalks at each revolution. The handles H H permit the front of the machine to be raised or lowered, thus permitting the cotton-chopper to cut deep or shallow, as may be desired.

The lightness of cotton-seed, and the film of lint surrounding and causing the same to cling together by a partial felting of the said film, requires some jarring-device, like the one just explained, to dislodge and drop them, and the throat through which the seed are dropped requires to be larger in proportion than similar discharging-apertures for other grain.

The cultivators and seeding-machines, as heretofore constructed, have the driving-wheel bearings attached rigidly to the framework, and thereby are liable to the important objection of being difficult to control, as the ploughs are frequently lifted in hard soil, and the seed irregularly dropped, the wheels, in many cases, rising clear of the surface, and any obstacles or unevenness of the ground causing irregular and intermittent seeding. These machines require, for their satisfactory operation, that the soil be freed from all inequalities, and thoroughly pulverized, thus confining their employment to level and carefully-prepared ground. By the employment of a yielding or spring-bearing, as above described, this important difficulty is overcome, and the machine rendered more universally available. Two rows of cotton can be planted at each passage of the machine. The cotton-hoppers can be removed and corn-drills substituted.

In operating this machine, the hoppers O are charged with cotton-seed and the machine drawn forward. The gearing acting as before described, brings the pins $a$ $a$ to strike the plate-springs $r$, and the cotton-seeds are shaken, causing a portion of them to fall into the furrow beneath.

For sowing small grain, a similar action of the points of the star-wheel lifts the agitator $i$ from over the holes, when the jar produced by the spring $s'$ causes a quantity of the grain to drop. This operation produces a regular deposit of the grain.

The additional advantages claimed for this invention are, its simplicity, durability, and small number of parts, which constitute it a cultivator and seeder long needed, and one that will be appreciated by the agricultural interest.

Having thus described my invention, what I claim as new, and desire to secure by Letters Patent, is—

1. The employment of the spring S, as constructed, or other equivalent device, for obtaining in cultivators or seeders, of whatever kind or construction, a vertically-yielding tension, substantially as and for the purpose herein shown and described.

2. The plates $m$, operated substantially as and for the purpose herein shown and described.

3. The hopper or trough O', with its agitator, $i$, substantially as and for the purposes shown and described.

4. The star-wheel J, or other equivalent device for lifting the agitator $i$, substantially as and for the purposes herein shown and described.

LEWIS BISHOP.

Witnesses:
A. LAWSON,
J. P. SHAFFER.